(12) United States Patent
Inam et al.

(10) Patent No.: US 10,218,175 B2
(45) Date of Patent: *Feb. 26, 2019

(54) DYNAMIC AND INTEGRATED CONTROL OF TOTAL POWER SYSTEM USING DISTRIBUTED IMPEDANCE INJECTION MODULES AND ACTUATOR DEVICES WITHIN AND AT THE EDGE OF THE POWER GRID

(71) Applicant: Smart Wires Inc., San Francisco, CA (US)

(72) Inventors: Haroon Inam, San Jose, CA (US); Frank Kreikebaum, Oakland, CA (US); Debrup Das, Union City, CA (US); Amrit Iyer, San Leandro, CA (US); Aaron Zhao, Fremont, CA (US)

(73) Assignee: Smart Wires Inc., Union City, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 15/428,906

(22) Filed: Feb. 9, 2017

(65) Prior Publication Data
US 2017/0237255 A1    Aug. 17, 2017

Related U.S. Application Data

(63) Continuation-in-part of application No. 15/068,397, filed on Mar. 11, 2016, now Pat. No. 10,097,037.
(Continued)

(51) Int. Cl.
*G05D 9/00*    (2006.01)
*G05B 15/02*    (2006.01)
(Continued)

(52) U.S. Cl.
CPC .............. *H02J 3/06* (2013.01); *G05B 15/02* (2013.01); *H02J 3/24* (2013.01); *H02J 13/0006* (2013.01);
(Continued)

(58) Field of Classification Search
CPC ............................... G05B 10/02; G05B 15/02
(Continued)

(56) References Cited

U.S. PATENT DOCUMENTS 2,237,812 A    4/1941   De Blieux
2,551,841 A    5/1951   Kepple et al.
(Continued)

FOREIGN PATENT DOCUMENTS

CH    660094    3/1987
CN    103256337    8/2013
(Continued)

OTHER PUBLICATIONS

"Office Action Dated Jan. 4, 2018; U.S. Appl. No. 15/068,397", Jan. 4, 2018.
(Continued)

*Primary Examiner* — Michael J Brown
(74) *Attorney, Agent, or Firm* — Womble Bond Dickinson (US) LLP

(57) ABSTRACT

A system architecture and method for enabling hierarchical intelligent control with appropriate-speed communication and coordination of control using intelligent distributed impedance/voltage injection modules, local intelligence centers, other actuator devices and miscellaneous FACTS coupled actuator devices is disclosed. Information transfer to a supervisory utility control is enabled for responding to integral power system disturbances, system modelling and optimization. By extending the control and communication capability to the edge of the HV power grid, control of the
(Continued)

distribution network through FACTS based Demand response units is also enabled. Hence an integrated and hierarchical total power system control is established with distributed impedance/voltage injection modules, local intelligence centers, connected other actuator devices, miscellaneous FACTS coupled devices and utility supervisory all networked at appropriate speeds allowing optimization of the total power system from generation to distribution.

28 Claims, 11 Drawing Sheets

Related U.S. Application Data

(60) Provisional application No. 62/353,479, filed on Jun. 22, 2016, provisional application No. 62/294,230, filed on Feb. 11, 2016.

(51) Int. Cl.
| | |
|---|---|
| *H02J 3/06* | (2006.01) |
| *H02J 13/00* | (2006.01) |
| *H02J 3/24* | (2006.01) |
| *H02J 3/18* | (2006.01) |
| *H02J 3/38* | (2006.01) |
| *H02J 3/00* | (2006.01) |

(52) U.S. Cl.
CPC ......... *H02J 13/0079* (2013.01); *H02J 3/1835* (2013.01); *H02J 3/381* (2013.01); *H02J 2003/001* (2013.01); *Y02E 40/30* (2013.01); *Y02E 40/72* (2013.01); *Y02E 40/74* (2013.01); *Y02E 60/74* (2013.01); *Y02P 80/14* (2015.11); *Y04S 10/12* (2013.01); *Y04S 10/22* (2013.01); *Y04S 10/30* (2013.01); *Y04S 10/525* (2013.01)

(58) Field of Classification Search
USPC ....................................................... 700/295
See application file for complete search history.

(56) References Cited

U.S. PATENT DOCUMENTS

| | | | |
|---|---|---|---|
| 3,556,310 A | 1/1971 | Loukotsky |
| 3,704,001 A | 11/1972 | Sloop |
| 3,750,992 A | 8/1973 | Johnson |
| 3,913,003 A | 10/1975 | Felkel |
| 4,025,824 A | 5/1977 | Cheatham |
| 4,057,736 A | 11/1977 | Jeppson |
| 4,103,853 A | 8/1978 | Bannan |
| 4,164,345 A | 8/1979 | Arnold et al. |
| 4,200,899 A | 4/1980 | Volman et al. |
| 4,277,639 A | 7/1981 | Olsson |
| 4,286,207 A | 8/1981 | Spreadbury et al. |
| 4,323,722 A | 4/1982 | Winkelman |
| 4,367,512 A | 1/1983 | Fujita |
| 4,514,950 A | 5/1985 | Goodson, Jr. |
| 4,562,360 A | 12/1985 | Fujimoto |
| 4,577,826 A | 3/1986 | Bergstrom et al. |
| 4,710,850 A | 12/1987 | Jahn et al. |
| 4,821,138 A | 4/1989 | Nakano et al. |
| 4,903,927 A | 2/1990 | Farmer |
| 5,006,846 A | 4/1991 | Granville et al. |
| 5,023,768 A | 6/1991 | Collier |
| 5,032,738 A | 7/1991 | Vithayathil |
| 5,193,774 A | 3/1993 | Rogers |
| 5,461,300 A | 10/1995 | Kappenman |
| 5,469,044 A | 11/1995 | Gyugyi et al. |
| 5,610,501 A | 3/1997 | Nelson et al. |
| 5,648,888 A | 7/1997 | Le Francois et al. |
| 5,844,462 A | 12/1998 | Rapoport et al. |
| 5,884,886 A | 3/1999 | Hageli |
| 5,886,888 A | 3/1999 | Akamatsu et al. |
| 5,986,617 A | 11/1999 | McLellan |
| 6,088,249 A | 7/2000 | Adamson |
| 6,134,105 A | 10/2000 | Lueker |
| 6,147,581 A | 11/2000 | Rancourt et al. |
| 6,215,653 B1 | 4/2001 | Cochran et al. |
| 6,233,137 B1 | 5/2001 | Kolos et al. |
| 6,335,613 B1 | 1/2002 | Sen et al. |
| 6,486,569 B2 | 11/2002 | Couture |
| 6,727,604 B2 | 4/2004 | Couture |
| 6,831,377 B2 | 12/2004 | Yampolsky et al. |
| 6,895,373 B2 | 5/2005 | Garcia et al. |
| 6,914,195 B2 | 7/2005 | Archambault et al. |
| 7,090,176 B2 | 8/2006 | Chavot et al. |
| 7,091,703 B2 | 8/2006 | Folts et al. |
| 7,105,952 B2 | 9/2006 | Divan et al. |
| 7,193,338 B2 | 3/2007 | Ghali |
| 7,352,564 B2 | 4/2008 | Courtney |
| 7,460,931 B2 | 12/2008 | Jacobson |
| 7,642,757 B2 | 1/2010 | Yoon et al. |
| 7,688,043 B2 | 3/2010 | Toki et al. |
| 7,834,736 B1 | 11/2010 | Johnson et al. |
| 7,835,128 B2 | 11/2010 | Divan et al. |
| 7,932,621 B1 | 4/2011 | Spellman |
| 8,019,484 B2 | 9/2011 | Korba et al. |
| 8,249,836 B2 | 8/2012 | Yoon et al. |
| 8,270,558 B2 | 9/2012 | Dielissen |
| 8,310,099 B2 | 11/2012 | Engel et al. |
| 8,401,709 B2 | 3/2013 | Cherian et al. |
| 8,441,778 B1 | 5/2013 | Ashmore |
| 8,497,592 B1 | 7/2013 | Jones |
| 8,680,720 B2 | 3/2014 | Schauder et al. |
| 8,681,479 B2 | 3/2014 | Englert et al. |
| 8,816,527 B1 | 8/2014 | Ramsay et al. |
| 8,825,218 B2 | 9/2014 | Cherian et al. |
| 8,867,244 B2 | 10/2014 | Trainer et al. |
| 8,872,366 B2 | 10/2014 | Campion et al. |
| 8,890,373 B2 | 11/2014 | Savolainen et al. |
| 8,896,988 B2 | 11/2014 | Subbaiahthever et al. |
| 8,922,038 B2 | 12/2014 | Bywaters et al. |
| 8,957,752 B2 | 2/2015 | Sharma et al. |
| 8,996,183 B2 | 3/2015 | Forbes, Jr. |
| 9,099,893 B2 | 8/2015 | Schmiegel et al. |
| 9,124,100 B2 | 9/2015 | Ukai et al. |
| 9,124,138 B2 | 9/2015 | Mori et al. |
| 9,130,458 B2 | 9/2015 | Crookes et al. |
| 9,172,246 B2 | 10/2015 | Ramsay et al. |
| 9,178,456 B2 | 11/2015 | Smith et al. |
| 9,185,000 B2 | 11/2015 | Mabilleau et al. |
| 9,207,698 B2 | 12/2015 | Forbes, Jr. |
| 9,217,762 B2 | 12/2015 | Kreikebaum et al. |
| 9,246,325 B2 | 1/2016 | Coca Figuerola et al. |
| 9,325,173 B2 | 4/2016 | Varma et al. |
| 9,331,482 B2 | 5/2016 | Huang |
| 9,659,114 B2 | 5/2017 | He et al. |
| 9,843,176 B2 | 12/2017 | Gibson et al. |
| 2002/0005668 A1 | 1/2002 | Couture |
| 2002/0042696 A1 | 4/2002 | Garcia et al. |
| 2003/0006652 A1 | 1/2003 | Couture |
| 2003/0098768 A1 | 5/2003 | Hoffmann et al. |
| 2004/0217836 A1 | 11/2004 | Archambault et al. |
| 2005/0052801 A1 | 3/2005 | Ghali |
| 2005/0073200 A1 | 4/2005 | Divan et al. |
| 2005/0194944 A1 | 9/2005 | Folts et al. |
| 2005/0205726 A1 | 9/2005 | Chavot et al. |
| 2006/0085097 A1 | 4/2006 | Courtney |
| 2007/0135972 A1 | 6/2007 | Jacobson |
| 2007/0250217 A1 | 10/2007 | Yoon et al. |
| 2008/0103737 A1 | 5/2008 | Yoon et al. |
| 2008/0157728 A1 | 7/2008 | Toki et al. |
| 2008/0177425 A1 | 7/2008 | Korba et al. |
| 2008/0278976 A1 | 11/2008 | Schneider et al. |
| 2008/0310069 A1 | 12/2008 | Divan et al. |
| 2009/0243876 A1 | 10/2009 | Lilien et al. |
| 2009/0281679 A1 | 11/2009 | Taft et al. |
| 2010/0026275 A1 | 2/2010 | Walton |
| 2010/0177450 A1* | 7/2010 | Holcomb ............... H02H 9/023 361/19 |
| 2010/0213765 A1 | 8/2010 | Engel et al. |

(56) References Cited

U.S. PATENT DOCUMENTS

| | | | |
|---|---|---|---|
| 2010/0302744 | A1 | 12/2010 | Englert et al. |
| 2011/0060474 | A1 | 3/2011 | Schmiegel et al. |
| 2011/0095162 | A1 | 4/2011 | Parduhn et al. |
| 2011/0106321 | A1 | 5/2011 | Cherian et al. |
| 2011/0172837 | A1 | 7/2011 | Forbes, Jr. |
| 2012/0105023 | A1 | 5/2012 | Schauder et al. |
| 2012/0146335 | A1 | 6/2012 | Bywaters et al. |
| 2012/0205981 | A1 | 8/2012 | Varma et al. |
| 2012/0242150 | A1 | 9/2012 | Ukai et al. |
| 2012/0255920 | A1 | 10/2012 | Shaw et al. |
| 2012/0293920 | A1 | 11/2012 | Subbaiahthever et al. |
| 2013/0002032 | A1 | 1/2013 | Mori et al. |
| 2013/0033103 | A1 | 2/2013 | McJunkin et al. |
| 2013/0044407 | A1 | 2/2013 | Byeon et al. |
| 2013/0094264 | A1 | 4/2013 | Crookes et al. |
| 2013/0128636 | A1 | 5/2013 | Trainer et al. |
| 2013/0166085 | A1 | 6/2013 | Cherian et al. |
| 2013/0169044 | A1 | 7/2013 | Stinessen et al. |
| 2013/0182355 | A1 | 7/2013 | Coca Figuerola et al. |
| 2013/0184894 | A1 | 7/2013 | Sakuma et al. |
| 2013/0200617 | A1 | 8/2013 | Smith et al. |
| 2013/0249321 | A1 | 9/2013 | Gao et al. |
| 2013/0277082 | A1 | 10/2013 | Hyde et al. |
| 2013/0345888 | A1 | 12/2013 | Forbes, Jr. |
| 2014/0025217 | A1 | 1/2014 | Jin et al. |
| 2014/0032000 | A1 | 1/2014 | Chandrashekhara et al. |
| 2014/0111297 | A1 | 4/2014 | Earhart et al. |
| 2014/0129195 | A1 | 5/2014 | He et al. |
| 2014/0132229 | A1 | 5/2014 | Huang |
| 2014/0153383 | A1 | 6/2014 | Mabilleau et al. |
| 2014/0188689 | A1 | 7/2014 | Kalsi et al. |
| 2014/0203640 | A1 | 7/2014 | Stinessen |
| 2014/0210213 | A1 | 7/2014 | Campion et al. |
| 2014/0246914 | A1 | 9/2014 | Chopra et al. |
| 2014/0247554 | A1 | 9/2014 | Sharma et al. |
| 2014/0268458 | A1 | 9/2014 | Luciani et al. |
| 2014/0312859 | A1 | 10/2014 | Ramsay et al. |
| 2014/0327305 | A1 | 11/2014 | Ramsay et al. |
| 2014/0347158 | A1 | 11/2014 | Goeke et al. |
| 2015/0012146 | A1 | 1/2015 | Cherian et al. |
| 2015/0029764 | A1 | 1/2015 | Peng |
| 2015/0051744 | A1 | 2/2015 | Mitra |
| 2015/0184415 | A1 | 7/2015 | Bushore |
| 2015/0226772 | A1 | 8/2015 | Kreikebaum et al. |
| 2015/0244307 | A1 | 8/2015 | Cameron |
| 2015/0270689 | A1 | 9/2015 | Gibson et al. |
| 2016/0036231 | A1 | 2/2016 | Ramsay et al. |
| 2016/0036341 | A1 | 2/2016 | Jang et al. |
| 2017/0163036 | A1 | 6/2017 | Munguia et al. |
| 2017/0169928 | A1 | 6/2017 | Carrow et al. |

FOREIGN PATENT DOCUMENTS

| | | |
|---|---|---|
| CN | 203668968 | 6/2014 |
| JP | 2002-199563 | 7/2002 |
| JP | 2005-045888 | 2/2005 |
| JP | 2015-086692 | 5/2015 |
| KR | 10-1053514 | 8/2011 |
| WO | WO-2008/082820 | 7/2008 |
| WO | WO-2014/035881 | 3/2014 |
| WO | WO-2014/074956 | 5/2014 |
| WO | WO-2014/099876 | 6/2014 |
| WO | WO-2015/074538 | 5/2015 |
| WO | WO-2015/119789 | 8/2015 |

OTHER PUBLICATIONS

"International Search Report and Written Opinion of the International Searching Authority dated Apr. 28, 2017; International Application No. PCT/US2017/017559", Apr. 28, 2017.

"International Search Report and Written Opinion of the International Searching Authority dated Apr. 3, 2017; International Application No. PCT/US2016/063200", dated Apr. 3, 2017.

"Invitation to Pay Additional Fees Dated Jan. 18, 2017; International Application No. PCT/US2016/063200", Jan. 18, 2017.

Amin, S. M. et al., "Toward a Smart Grid: Power Delivery for the 21st Century", IEEE power & energy magazine, vol. 3, No. 5, Sep./Oct. 2005, pp. 34-41.

Angeladas, Emmanouil , "High Voltage Substations Overview (part 1)", Siemens, Jan. 24, 2013, pp. 1-8.

Aquino-Lugo, Angel A. , "Distributed and Decentralized Control of the Power Grid", Ph.D. Dissertation, University of Illinois at Urbana-Champaign, 2010, 172 pp. total.

Dash, P. K. et al., "Digital Protection of Power Transmission Lines in the Presence of Series Connected FACTS Devices", IEEE Power Engineering Society Winter Meeting, 2000, pp. 1967-1972.

Divan, D. M., "Nondissipative Switched Networks for High-Power Applications", Electronics Letters, vol. 20, No. 7, Mar. 29, 1984, pp. 277-279.

Funato, Hirohito et al., "Realization of Negative Inductance Using Variable Active-Passive Reactance (VAPAR)", IEEE Transactions on Power Electronics, vol. 12, No. 4, Jul. 1997, pp. 589-596.

Gyugyi, Laszlo et al., "Status Synchronous Series Compensator: A Solid-State Approach to the Series Compensation of Transmission Lines", IEEE Transactions on Power Delivery, vol. 12, No. 1, Jan. 1997, pp. 406-417.

Gyugyi, Laszlo et al., "The Interline Power Flow Controller Concept: A New Approach to Power Flow Management in Transmission Systems", IEEE Transactions on Power Delivery, vol. 14, No. 3, Jul. 1999, pp. 1115-1123.

Kavitha, M. et al., "Integration of FACTS into Energy Storage Systems for Future Power Systems Applications", International Journal of Advanced Research in Electrical, Electronics and Instrumentation Engineering, vol. 2, Issue 2, Feb. 2013, pp. 800-810.

Kumbhar, Mahesh M. et al., "Smart Grid: Advanced Electricity Distribution Network", IOSR Journal of Engineering (IOSRJEN), vol. 2, Issue 6, Jun. 2012, pp. 23-29.

Lambert, Frank C. , "Power Flow Control", ISGT Europe, 2014, Istanbul, Turkey, Oct. 13, 2014, pp. 1-15.

Lehmkoster, Carsten , "Security Constrained Optimal Power Flow for an Economical Operation of FACTS-Devices in Liberalized Energy Markets", IEEE Transactions on Power Delivery, vol. 17, No. 2, Apr. 2002, pp. 603-608.

Mali, Bhairavanath N. et al., "Performance Study of Transmission Line Ferranti Effect and Fault Simulation Model Using MATLAB", International Journal of Innovative Research in Electrical, Electronics, Instrumentation and Control Engineering, vol. 4, Issue 4, Apr. 2016, pp. 49-52.

Mutale, Joseph et al., "Transmission Network Reinforcement Versus FACTS: An Economic Assessment", IEEE Transactions on Power Systems, vol. 15, No. 3, Aug. 2000, pp. 961-967.

Ramchurn, Sarvapali D. et al., "Putting the 'Smarts' into the Smart Grid: A Grand Challenge for Artificial Intelligence", Communications of the ACM, vol. 55, No. 4, Apr. 2012, pp. 86-97.

Reddy, D. M. et al., "FACTS Controllers Implementation in Energy Storage Systems for Advanced Power Electronic Applications—A Solution", American Journal of Sustainable Cities and Society, Issue 2, vol. 1, Jan. 2013, pp. 36-63.

Renz, B. A. et al., "AEP Unified Power Flow Controller Performance", IEEE Transactions on Power Delivery, vol. 14, No. 4, Oct. 1999, pp. 1374-1381.

Ribeiro, P. et al., "Energy Storage Systems", Chapters 1-2.4 of Section entitled "Energy Storage Systems" in Electrical Engineering—vol. III, edited by Kit Po Wong, Encyclopedia of Life Support Systems (EOLSS) Publications, Dec 13, 2009, 11 pp. total.

Schauder, C. D. et al., "Operation of the Unified Power Flow Controller (UPFC) Under Practical Constraints", IEEE Transactions on Power Delivery, vol. 13, No. 2, Apr. 1998, pp. 630-639.

Siemens Sas, , "Portable Power Solutions, "Plug and play" High Voltage E-Houses, skids and mobile high voltage substations up to 420 kV", Nov. 2015, 8 pp. total.

Swain, S. C. et al., "Design of Static Synchronous Series Compensator Based Damping Controller Employing Real Coded Genetic Algorithm", International Journal of Electrical, Computer, Energetic, Electronic and Communication Engineering, vol. 5, No. 3, 2011, pp. 399-407.

(56) References Cited

OTHER PUBLICATIONS

Xue, Yiyan et al., "Charging Current in Long Lines and High-Voltage Cables—Protection Application Considerations", 67th Annual Georgia Tech Protective Relaying Conference, Atlanta, Georgia, May 8-10, 2013, pp. 1-17.

"Notice of Allowance dated May 23, 2018; U.S. Appl. No. 15/068,397", dated May 23, 2018.

Albasri, Fadhel A. et al., "Performance Comparison of Distance Protection Schemes for Shung-Facts Compensated Transmission Lines", IEEE Transactions on Power Delivery, vol. 22, No. 4, Oct. 2007, pp. 2116-2125.

Bhaskar, M. A. et al., "Impact of FACTS devices on distance protection in Transmission System", 2014 IEEE National Conference on Emerging Trends in New & Renewable Energy Sources and Energy Management (NCET NRES EM), Dec. 16, 2014, pp. 52-58.

Samantaray, S. R., "A Data-Mining Model for Protection of Facts-Based Transmission Line", IEEE Transactions on Power Delivery, vol. 28, No. 2, Apr. 2013, pp. 612-618.

* cited by examiner

DYNAMIC AND INTEGRATED CONTROL OF TOTAL POWER SYSTEM USING DISTRIBUTED IMPEDANCE INJECTION MODULES AND ACTUATOR DEVICES WITHIN AND AT THE EDGE OF THE POWER GRID

CROSS-REFERENCE TO RELATED APPLICATIONS

This application is a continuation-in-part of U.S. patent application Ser. No. 15/068,397 filed Mar. 11, 2016, which claims the benefit of U.S. Provisional Patent Application No. 62/294,230 filed Feb. 11, 2016, and this application also claims the benefit of U.S. Provisional Patent Application No. 62/353,479 filed Jun. 22, 2016.

BACKGROUND OF THE INVENTION

1. Field of the Invention

The present invention relates to systems for distributed control, from generation to distribution with the supervision of the total power system by using a plurality of inter-linked actuators that include self-aware distributed impedance/voltage injection modules, energy storage devices, and other FACTS devices each having a high-speed (sub-cyclic) intercommunication capability and local control capability.

2. Prior Art

Most power utilities use energy management system (EMS) and supervisory control and data acquisition (SCADA) control systems to control HV power grid. These control systems connect and communicate between the power flow control units at the substations that are used to limit current flows or load imbalances over the HV power grid lines and provide interactive control of the power transmission on the HV power grid. Distributed and localized control of power flow, over the high voltage transmission lines using self-aware (with built-in capability to recognize problems/intelligence) distributed impedance (or equivalent voltage) injection modules (DIIMs) 102, has been proposed and is being implemented by the inventors of the current application as shown in FIG. 1 and FIG. 2. These DIIMs 102 are able to recognize changes in line current on the high-voltage lines, to which these are attached, and inject an appropriate inductive or capacitive impedance (alternately inject an equivalent voltage component) on to the line to locally balance the lines for power transfer.

Referring to FIG. 1 these self-aware (with built-in capability to recognize problems/intelligence) distributed impedance injection modules (DIIMs) 102 are distributed on segments of the high voltage (HV) transmission line 108, supported by, but insulated from, the towers 110, between the generation station 104 and the distribution points 106. These DIIMs 102 provide the capability of localized control of line current and line balancing for the local HV transmission line segment to which these are attached.

FIG. 2 provides a more detailed block diagram 200 of distributed control of the HV power grid by the DIIMs 102 injecting an impedance or equivalent voltage on the segments of the high voltage power transmission line 108 on which these are suspended. The HV power transmission lines are themselves supported by towers 201. The substations 204 with generation capability 203 and loads 205 are also shown. The overall control of the transfer of power between the generators and loads is monitored and controlled by a utility supervisory 206 that communicates with the substations via normal communication channels 207 for monitoring and control.

FIG. 2A is a block diagram 200A of the prior art implementation of controlling of the HV power grid using static synchronous series compensators (SSSCs) at the substations 204 that send information to the utility 206 and receive control instructions from the utility 206. The data and control are transferred over normal wired or wireless communication links 207 from SSSCs at the substations 204 to and from the utility 206. The generation capacity 203 and the distribution points 205 are connected to the HV power grid through the substations 204. The substations 204 are themselves enabled for power transfer over the high voltage (HV) transmission lines 108 suspended from the transmission towers 201.

FIG. 2B shows a block diagram 200B for prior art (U.S. Pat. No. 8,401,709) local control of the HV power grid using existing resources proposed by the identified prior art Cherian applications and patents. These implementations are for unified power system control from the main generation 203 and distributed generators 213-1 and 213-2 (wind, solar, etc.) to distribution loads 205-1 to 205-3 connected by local power distribution lines 109, by local control modules 215-1 and 215-2. The control of the power system is proposed by controlling the existing assets at the substations 204-1 and 204-2 by using regional control modules 225 at the substations 204-1 and 204-2, using centralized computer programs at the enterprise control module 206, with generation and distribution connections to the HV power grid system. Such a system has been proposed by the Cherian applications, where data visualization programs 280 with smart grid control programs 285 use system modeling and simulation capability 290 at the enterprise 206. The proposed power system of control uses existing wireless area network (WAN) connections 230 to communicate with the various substations and for communication between the substations 204-1 and 204-2 and the enterprise control.

In order to improve the performance of the existing HV power grid flexible alternating current transmission system (FACTS) devices are being employed within, at the edge and outside the edge of the HV power grid. These FACTS devices are typically high-voltage compatible subsystems that are coupled directly to the HV power grid even though in certain circumstances the physical connection may be at the MV (medium-voltage) level. The devices and systems include the static synchronous series compensators (SSSC)], static synchronous compensators (STATCOMs), unified power-flow controllers (UPFCs), interline power-flow controllers (IPFCs) and other electronic systems for monitoring and control, typically connected at the sub-stations and in communication with the utility over normal communication channels to send data and receive control instructions. All these prior art implementations aid in maintaining and enhancing grid resiliency and power system stability through local VARs support and power-flow control of the prior art HV power grid.

The recent advances in distributed non-conventional generation, such as wind and solar energy systems, due to their respective uncertain natures, coupled with the cyclic nature of consumer demand for power, have made the optimization of power flow over the HV power grid from generation to distribution difficult. These random inputs and outputs to and outputs from the HV power grid have also made the HV Power grid more prone to disturbances, that result from sudden changes in supply or load that can disrupt the operation of the HV Power grid. These disturbances include small signal instability, power oscillations and sub-synchronous resonance among others. If left uncorrected these can grow and affect the overall operational stability of the HV power grid and the total power system. Hence the new HV power grid and the total power system require different and faster capabilities for line balancing and for overcoming disturbances introduced by the distributed nature of power generation and load changes. It is essential to improve the response capability of the HV power grid control in order to take care of the changed nature of the HV power grid and the total power system and its characteristics.

The problems to be addressed in this regard include balancing of lines when new distributed generation systems or loads come online and respond to disturbances. Due to the new nature of the HV power grid, such as responding to small signal stability issues, power oscillations damping (POD) and sub-synchronous resonance (SSR) damping on the HV power grid requires response at faster speeds to overcome more of these problems. The implementation of distributed energy storage capabilities that are coupled to the HV power grid will also have to be brought in and integrated to help in improving the stability of the HV power grid and the total power system as it is made more responsive to power changes on the HV power grid. Thus, it will be useful if the capability is established whereby responses to changes or disturbances on the HV power grid can be addressed locally, at appropriate speeds, in a hierarchical and integrated fashion and resolved using all the available capabilities and resources that exist, working in coordination. It will be of even further advantage if the total power system from generation to distribution can be brought together under an integrated and dynamic communication and control capability to enhance the stability and response to disturbances of the total power system.

BRIEF DESCRIPTION OF THE DRAWINGS

The drawings are made to point out and distinguish the invention from the prior art. The objects, features, and advantages of the invention are detailed in the description taken together with the drawings.

FIG. 2A is a block schematic of a non-distributed control system based in substations with Static Synchronous Series Compensators (SSSCs) for power grid control (prior art).

DETAILED DESCRIPTION OF THE PREFERRED EMBODIMENTS

Figure 1:
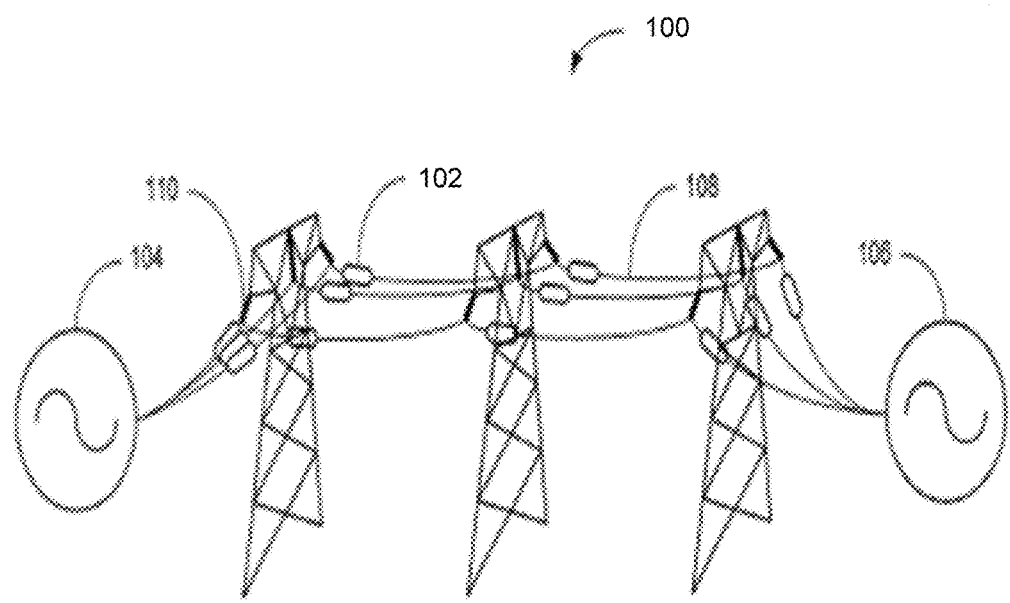
FIG. 1 is an exemplary block diagram of the prior art distributed control modules attached directly to the HV transmission lines (prior art).
Figure 2:
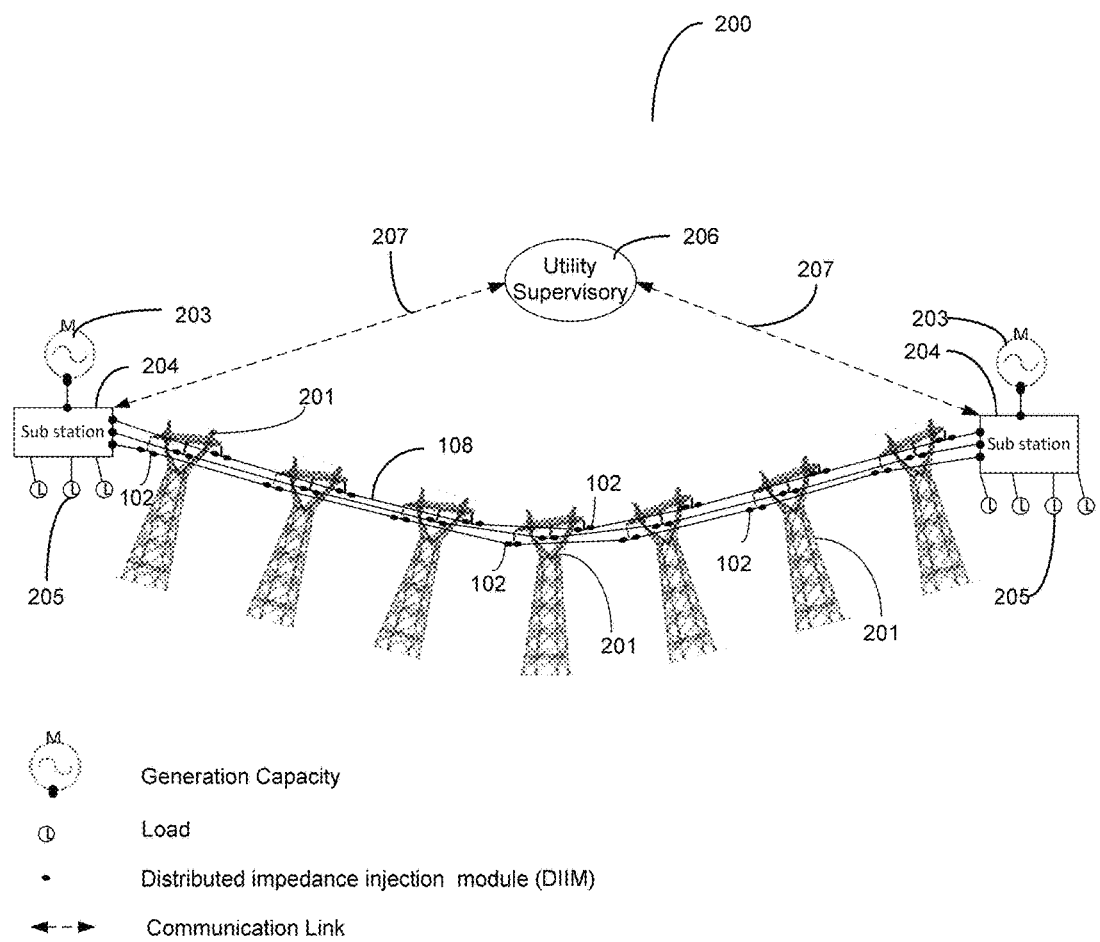
FIG. 2 is an exemplary block diagram of distributed control of a power grid system with centralized supervision by a utility (prior art).
Figure 2:
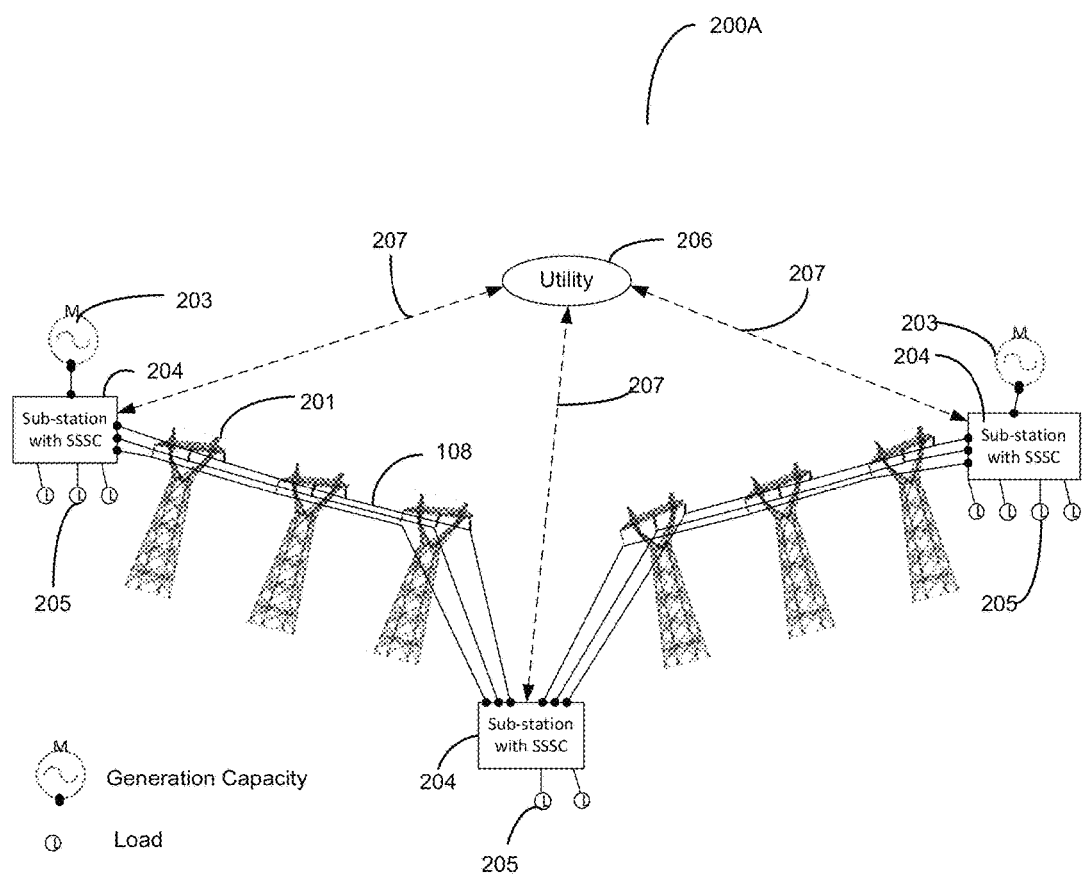
Figure 2B:
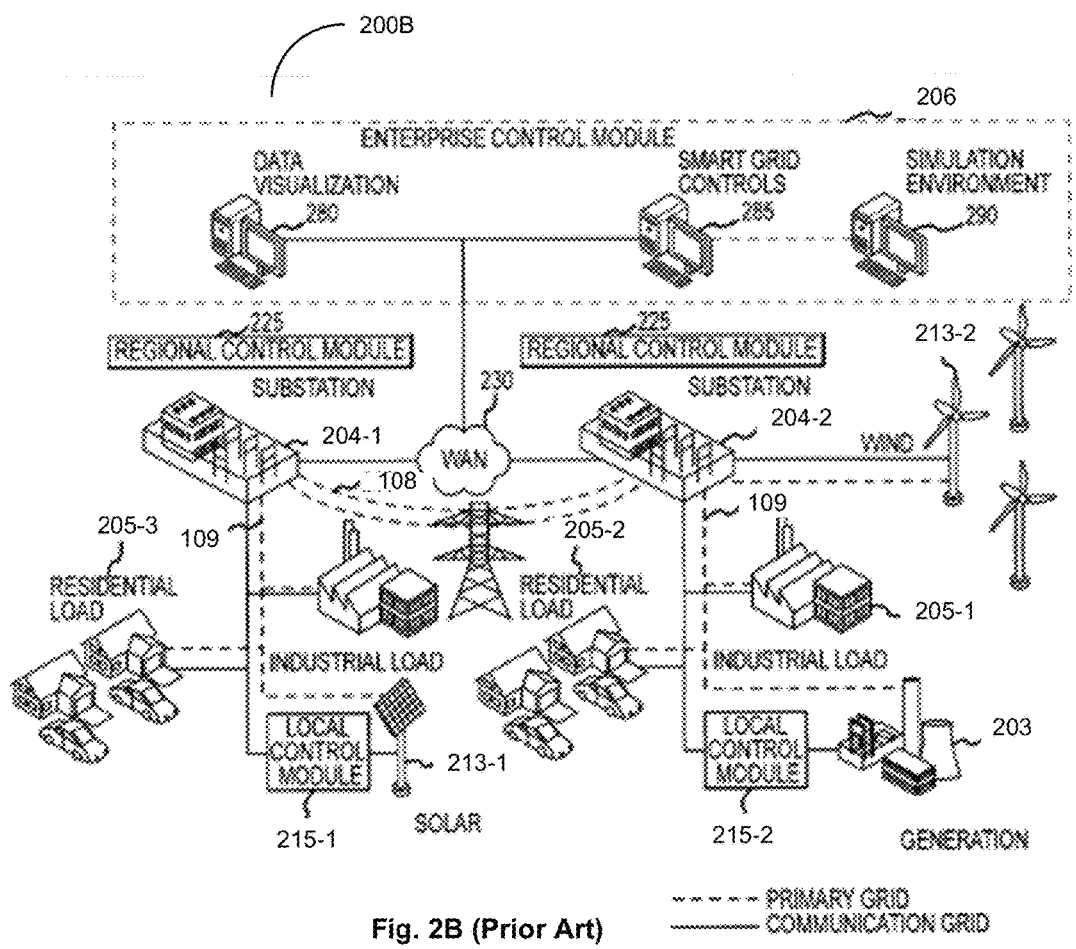
FIG. 2B is a block schematic of a grid control system using existing resources at the substations (prior art).

The following terms and acronyms are defined specifically to enhance the clarity of the current disclosure only.
1. High voltage (HV) power grid—is the HV power transmission system that transports power at high voltage from the power generators to the sub-stations or other distributed loads.
2. Total power system—This term includes therein power-generation capability, HV power grid, substations, power distribution capability, any and all power stabilization and control capability associated with the power generation, HV power grid and power distribution, including any energy-storage capabilities.
3. DIIMs—Self-aware (with built-in capability to recognize problems/intelligence) Distributed Impedance Injection Modules that are attached to the HV power grid to control the power flow on the HV transmission lines.
4. Distributed impedance injection modules—In this disclosure the term refers to high-speed communication capability enabled DIIMs. May also be referred to in the specification as CDIIMs, or individually as an injection module.
5. CDIIMs—alternate name for distributed impedance injection modules that are high-speed communication capability enabled DIIMs.
6. LINCs—the acronym in this disclosure refers to local intelligence centers connected to a plurality of local CDIIMs for enabling high-speed communication and coordinated local supervisory control.
7. High-speed communication capability—in this disclosure refers to communication speeds that enable the system components such as LINCs and self-aware distributed impedance injection modules (CDIIMs) to communicate with each other to respond to local problems at sub-cyclic speeds. (See for example FIG. 6 in parent application Ser. No. 15/068,397, entitled "System and Method for Distributed Grid Control with Sub-Cyclic Local Response Capability" filed on Mar. 11, 2016.)
8. Other actuator devices—In this disclosure other actuator modules refer to the flexible AC transmission systems (FACTS) devices connected to the HV power grid enabled with high-speed (sub-cyclic) communication capability and FACTS-based control capability—also referred to as FACTS control devices. Includes any and all of: static synchronous series compensators (SSSC), static synchronous compensators (STATCOMs), unified power-flow controllers (UPFCs), interline power-flow controllers (IPFCs) and other electronic systems for monitoring and control of the power flow over the HV power grid.

9. FACTS control devices—Alternate name for other actuator devices.

10. Distributed generators—in this application this refers to the distributed generation capability (other than the large conventional generation stations) that could be inside, at, or outside the edge of the HV power grid but are coupled to the HV power grid with FACTS-based control capability and enabled with high speed communication capability. These include: wind energy farms, Solar energy farms, bioenergy units, wave energy units, etc. that are typically non-conventional producers of energy. This also includes all conventional distributed generation sources but not traditional large generation capabilities such as pre-existing thermal power plants, atomic power plants, hydroelectric plants etc. that are controlled directly by the Supervisory Utility.

11. Energy storage devices—in this application distributed energy storage capability typically inside, at, or outside, the edge of the HV power grid but coupled to the HV power grid with or without FACTS-based control and enabled with high speed communication.

12. Distributed load demand response—in this application distributed load demand response units mean power distribution systems that are inside, at, or outside the edge of the HV power grid but are coupled to the HV power grid with or without FACTS-based control and enabled with high speed communication.

13. Miscellaneous FACTS-coupled actuator devices—refer to the group of systems and subsystems typically inside, at, or outside the edge of the HV power grid, that are described above, but are coupled to the HV power grid with FACTS-based control capability and high speed communication capability. These include distributed generators, distributed energy storage devices, and distributed load demand response (DR) devices.

14. Actuator devices—as used in this disclosure refers to all the group of electronic control devices within the edge, at the edge or outside the edge of the HV power grid that are enabled with FACTS-based control capability and high-speed communication capability and are coupled or connected to the HV power grid. The group comprise all or any of the other actuator devices and the miscellaneous FACTS-coupled actuator devices.

15. Edge of HV power grid—as used in the current disclosure is a term describing the boundary of the HV power grid, with some temporal and/or spatial functionality outside the direct control of utilities and distribution operators.

16. Supervisory utility or utility—In this disclosure supervisory utility refers to the supervisory entity enabled for central monitoring, modelling and control of the total power system having communication links to the LINCs for data collection and providing system control.

The invention disclosed is generally directed at integrating and using the capabilities of the distributed impedance injection modules, the other actuator modules and the miscellaneous FACTS-coupled actuator devices for providing very high reliability, standardized active control capability that is FACTS-based, to the total power system. The total power system is typically comprised of conventional and distributed generation units, HV power transmission grid, power/energy storage units, FACTS and non-FACTS control devices inside, at, or outside, the edge of the HV power grid and distributed load demand response units coupling the power distribution systems to the HV power grid. The integrated and hierarchical control capability proposed by the present invention disclosure using distributed impedance injection modules, other actuator modules and miscellaneous FACTS-coupled actuator devices, is a general concept and can be applied with any distributed impedance injection modules, other actuator devices and the miscellaneous FACTS controlled actuator devices inter-linked in a hierarchical fashion using LINCs for transfer of data using the appropriate speed communication capability. The control hierarchy using the CDIIMs, LINCs and Supervisory utility for providing total power system control. These generic concepts are now disclosed using specific implementation details for clarity.

The details of the invention disclosed are directed at using distributed impedance injection modules such as CDIIMs with local high-speed (speeds that enable sub-cyclic response) communication and control capabilities provided by the local intelligence centers (LINCs), in high-speed communication with other actuator devices and miscellaneous FACTS-coupled actuator devices at and outside the HV power transmission grid edge. Such an integrated local communication and control is able to provide very high reliability, integrated and hierarchically managed, and standardized active control capability to the total power system. The total power system, as described previously, is comprised of distributed generation units, HV power transmission grid, energy storage units, other actuator devices and power distribution systems. The integrated control capability disclosed by the present invention using distributed impedance injection modules, other actuator devices and miscellaneous FACTS-coupled actuator devices are general concepts that are not meant to be limiting or be applicable using only a specific set of distributed impedance injection modules and other actuator devices. The invention can be implemented fully or partially using any appropriate distributed impedance injection modules, other actuator devices and miscellaneous FACTS-coupled actuator devices, that are within, at the edge, and outside the edge of the HV power grid as long as these have the capability for providing control and stability to the total power system including generation, transmission and distribution systems. In effect such proposed integrated control capability can be used effectively for transmission systems and distribution systems that include all micro-grid concepts and implementations.

Figure 3:
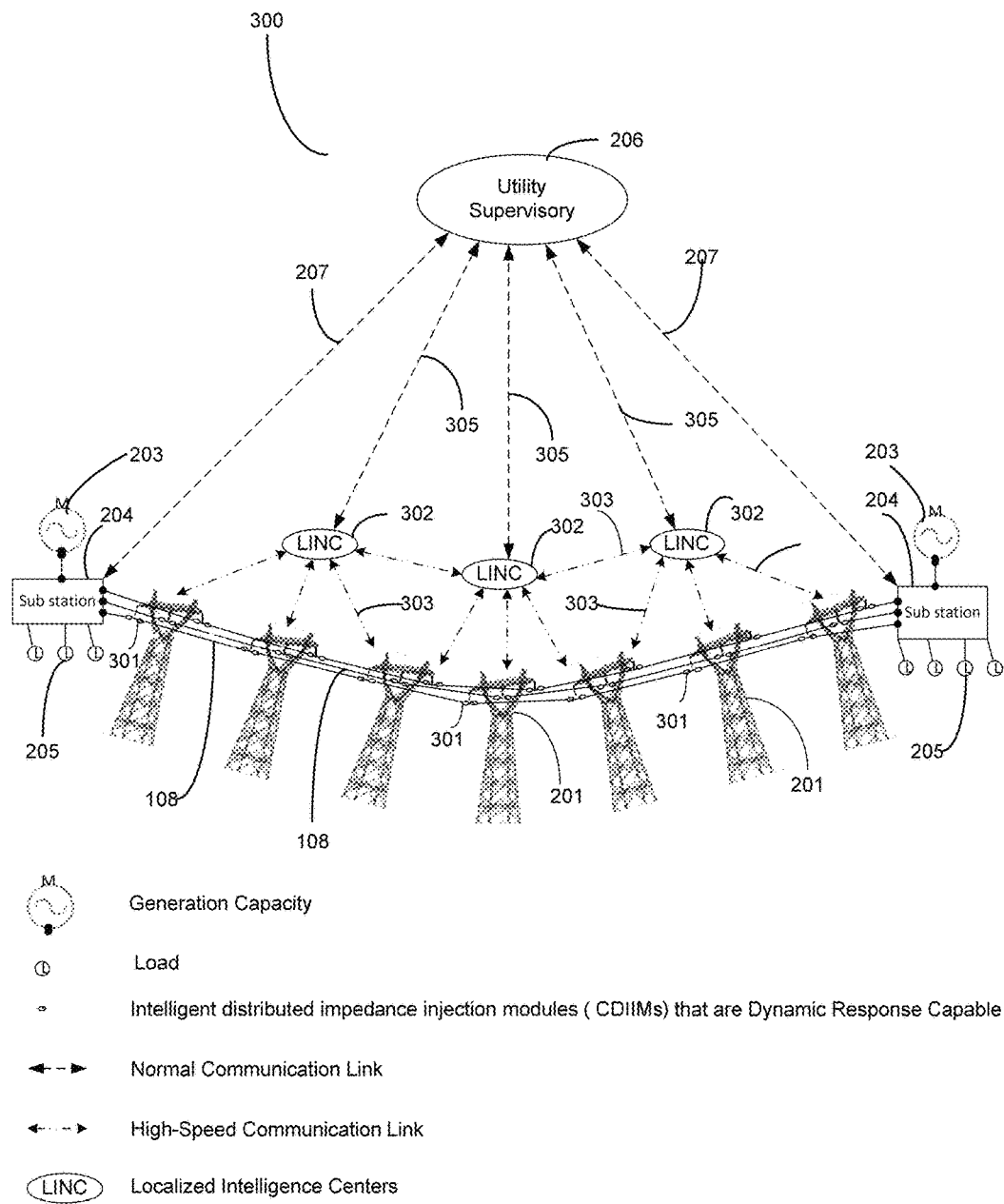
FIG. 3 is an exemplary schematic diagram of the distributed intelligent control system for power transfer and line balancing of the HV power grid with local intelligence centers (LINCs) for intercommunication and control of high-speed communication capability enabled self-aware distributed impedance injection modules (CDIIMs).

FIG. 3 is the block diagram 300 of the co-pending patent application (U.S. application Ser. No. 15/068,397 for "System and Method for Distributed Grid Control with Sub-Cyclic Local Response Capability" filed on Mar. 11, 2016, that is the parent of the current application which is included herein in its entirety by reference.) FIG. 3 shows the distributed and hierarchical intelligent control system for the HV power grid. Sub-cyclic control has been identified as an essential need to have a stable and dynamic HV power grid and total power system. The HV power grid and the total power system should be able to handle issues of stability, intermittency, and transients that are inherent in the new distributed or localized renewable power generation and distributed loads that are being coupled to the HV power grid. For the HV power grid and the total power system to be stable under these conditions, it is necessary for the response to disturbances on the grid to be within milliseconds (sub-cyclic) to prevent them from growing into major power delivery and quality issues, even brownouts.

Centralized control of the grid using high-level algorithms and modeling used for HV power grid control, in the past and currently, is not efficient in achieving the needed response under the above-described conditions due to the time delays inherently associated with the detection, communication, centralized decision making with associated latencies, and action. The solution to this problem is the distributed control based on the local distributed control modules, such as the intelligent and self-aware distributed impedance (or equivalent voltage) injection modules attached to the HV transmission lines 108 suspended from the towers 201, such as the CDIIMs 301 coupled to the high voltage (HV) power lines 108. These CDIIM 301 or distributed impedance injection modules are made self-aware and have sufficient intelligence, computing capability, communication capability and control capability to respond locally to any sensed disturbance in a sub-cyclic timeframe. To further improve the operational efficiencies of the HV power grid and provide fast response capability to overcome any disturbances recognized by the CDIIMs 301 locally, fast communication capability 303 has been established between the neighboring CDIIMs 301 and also the CDIIMs 301 and a local supervisory entity, the localized intelligence centers (LINCs) 302. Each LINC 302 provides communication and coordination of the operation of a plurality of CDIIM 301 covering a local area and also provides for high-speed communication 303 to other LINCs 302 when coordination and fast response is needed for disturbances that have the possibility of spreading to neighboring LINCs 302 controlled segments of the HV power grid. Communication 305 is also established from the LINCs 302 to and from the utility supervisory 206 using normal communication channels. Such communication 207 is also established to and from the substations 204 to the utility supervisory 206. These normal speed communication channels are used for monitoring, and supervisory control of the power grid, and the collection of data on power grid operations for simulation and optimization of the HV power grid operations. In FIG. 3 the generators 203 and loads 205 are shown connected to the sub-stations 204 which is no longer the case in the distributed generation power system that is currently evolving.

The aim of the disclosed invention is to expand the operation of the distributed impedance injection modules CDIIMs, LINCs to optimize the operation of the total power system by providing standardized high-speed local control capability and high-speed local communication (sub-cyclic speeds) capability to the components and subsystems in the local segments of the HV transmission grid and the total power system. Currently a number of FACTS-based monitoring and control capabilities and FACTS-coupled subsystems that influence the operation of the total power system from generation to distribution are being implemented within, at the edge and outside the edge of the total power system. It is the aim of the current invention to integrate the capabilities of all these subsystems locally with the CDIIMs and LINCs to provide a standardized local control capability. This standardized local control capability is established by inter-connected distributed impedance (or equivalent voltage) injection modules, LINCs, other actuator devices and miscellaneous FACTS-coupled actuator devices. All of these are enabled with high-speed communication capability and FACTS-based control capability to allow these components and subsystems of the total power system to react to disturbances and changes in power inputs and outputs to the total power system in a sub-cyclic manner at the local level. The distributed impedance injection modules CDIIMs are still used to recognize the disturbances and problems of the HV power grid at the local level and, through the connected LINCs, are able to coordinate with the other actuator devices and miscellaneous FACTS-coupled actuator devices locally to provide optimum responses to the disturbances and problems identified. This helps to prevent the buildup of problems in the HV power grid and the associated subsystems, comprising the total power system. The invention uses the built-in high-speed FACTS-based control capability and high-speed communication capability of the CDIIMs, currently used for fast recognition and correction of localized power flow imbalances or other instabilities or alternate conditions to also recognize any disturbances of the local connected sections of the HV power grid. The invention standardizes this type of control capability and communication capability and extends it to the coupled controllable devices that are the other actuator devices and the miscellaneous FACTS-coupled actuator devices, inside, at the edge and outside the edge of the high-voltage power grid to achieve an integrated and coordinated power flow control and disturbance recovery capability for the total power system. To reduce the cost and provide additional flexibility for use with existing DIIMs, a plug-in version of the standardized high-speed communication module is also implemented, that convert the currently used self-aware intelligent distributed impedance (or equivalent voltage) injectors DIIMs 102 to distributed impedance injection modules CDIIMs 301. By providing the added high-speed communication capability to the DIIMs 102, converting them to distributed impedance injection modules CDIIMs 301 connected to the LINCs 302, the CDIIMs 301 and LINCs 302 are able to coordinate the actions of these CDIIM and other actuator devices and the miscellaneous FACTS-coupled actuator devices to respond in a coordinated fashion at the local level and also on a total power system level to the needs of the total power system, increasing system stability and security. By using all these interconnected actuators over the total power system, including the CDIIMs, and other actuator devices and connected miscellaneous FACTS-coupled actuator devices such as distributed generation systems, energy storage systems, distributed load demand response (DR) devices with FACTS-based control etc. inside and outside the edge of the HV power grid, a smooth and optimum control for transfer of power from the generation to distribution is achieved.

The changing nature of the new distributed generation sources, mainly from renewable resources, create the problem of uncontrollable power fluctuations on the total power system. Since this is the nature of all renewable energy resources, it is essential that the total power system is able to take care of the power fluctuations caused. That together with reduced inertia and reduced damping of these new generation sources, compared to the traditionally large conventional generation sources, is the reason why a distributed and agile solution that is different is required for control of the total power system. The control capability provided typically by the distributed impedance injection modules in coordination with other actuator devices and miscellaneous FACTS-coupled devices, (including the distributed generation sources and energy storage devices coupled to the HV power grid) that are interlinked through these CDIIMs and LINCs, using the high-speed communication capability, for information transfer and coordinated control, provide the ability to mitigate the impact of the variations and fluctuations on the transmission grid and the total power system. The only way to overcome the variations and fluctuations on the total power system efficiently is to provide for local control of multiple points of the total power system concurrently, using the FACTS-based control and high-speed communication capabilities, built into the components and subsystems of the total power system as per the present disclosed invention.

In the disclosed embodiment of the invention the distributed impedance (or equivalent voltage) injection modules that have intelligence and self-awareness built in are able to update the reference settings for itself and other actuator devices and miscellaneous FACTS-coupled devices, locally connected to it through the LINCs. This capability to dynamically adjust these settings as the local power system operating conditions change, especially due to the distributed nature of the renewable energy sources and loads, while the total power system is in operation, has not been attempted or thought of in the past. This is a key distinguishing feature of the current disclosed invention. This feature is applicable to both transmission as well as distribution systems that have the disclosed features.

Another important feature of the total power system control proposed is the integration of distributed energy storage devices, that are inside or outside the grid edge, into the total power system enabling control in a distributed and hierarchical fashion as a part of the integrated and standardized control of the, systems and subsystems of the total power system as an embodiment of the invention. A cause of instability of the HV power grid, especially under disturbances and fault conditions is the sudden changes in the phase angle during power injection or load changes by the distributed generation and distributed loading. By having the fast response capability to store any additional power and supply any additional load, from distributed locally controlled Energy storage devices, the propensity for instabilities and oscillations of the grid can be reduced or eliminated. This capability is further improved by the local control of the distribution provided by the Distributed Load demand response unit with FACTS-based control as per an embodiment of the invention.

The main components of the system to achieve the above include:
1. The first is to have distributed impedance (or equivalent voltage) injection modules attached to the power lines that are intelligent, self-aware, and can react independently to disturbances on the localized portions of the power grid.
   The CDIIM developed by the inventors and assigned to the inventors' parent organization meets the above requirement for distributed power grid control.
2. The second need is to have the miscellaneous FACTS-coupled actuator devices within the power grid, at the edge of the power grid, and outside the the power grid, such as distributed generators, (wind farm, solar farm etc.), energy storage devices (pumped storage, battery storage, flywheel storage, superconducting storage etc.), and other actuator devices, (such as devices providing Demand Response (DR) capabilities, and combinations of power system components with power electronic components that enable monitoring etc. in generation and distribution) all connected to the to the total power system using FACTS-based control, and enabled with standardized high-speed communication and control capability, such that they are enabled to communicate and interact with the supervising controllers designated localized intelligence centers (LINCs).
3. The third need is to establish high-speed interconnect and communication capability between the distributed impedance injection modules or CDIIM, and LINCs and the other connected actuator devices and miscellaneous FACTS-coupled actuator devices that comprise the distributed generators and storage devices, and other FACTS control devices coupled to the HV power grid, at and outside the HV power grid edge, with local supervising controllers, designated LINCs within the HV power grid and at the edge of the HV power grid. This enables coordinated action of the distributed impedance injection modules and all the other connected actuator devices in the total power system, to overcome and/or limit the disturbances within the local control area and the total power system via control capability established in a hierarchical manner. The communication capability enables heirarchical control, which is distributed control of the HV power grid segments by the CDIIM 301, providing local control of all connected and coupled devices and systems in the local area by the LINCs 302, to the total power system control by utility supervisory 206 in that order.
4. The established communication capability via reasonably fast and secure communication links interconnecting the local supervisory modules and communicating with the utility central supervisory control form the enabler for data compilation for simulations and for major remedial action in case of problems that cannot be resolved by the distributed impedance injection modules and the interconnected LINCs supervisory at the local level within the total power system.

Figure 4:
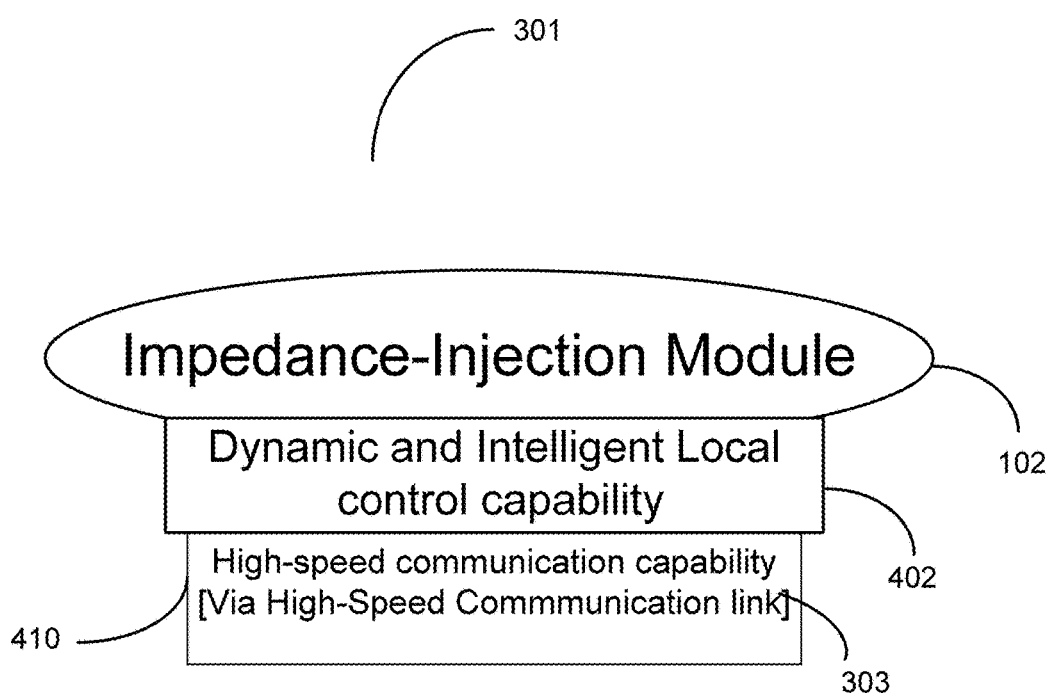
FIG. 4 is a block representation of the distributed actuator module or the self-aware distributed impedance injection modules (CDIIMs) 102 used with intelligent local control capability and high-speed communication capability as per the invention.

FIG. 4 shows a distributed impedance (or equivalent voltage) injection module (CDIIM 301) comprising a distributed impedance (or equivalent voltage) injection module 102 with an intelligent control capability 402 and high-speed communication capability 410, typically a high-speed transceiver, with connectivity through high speed link 303 to provide the sub-cyclic local response capability.

Figure 5:
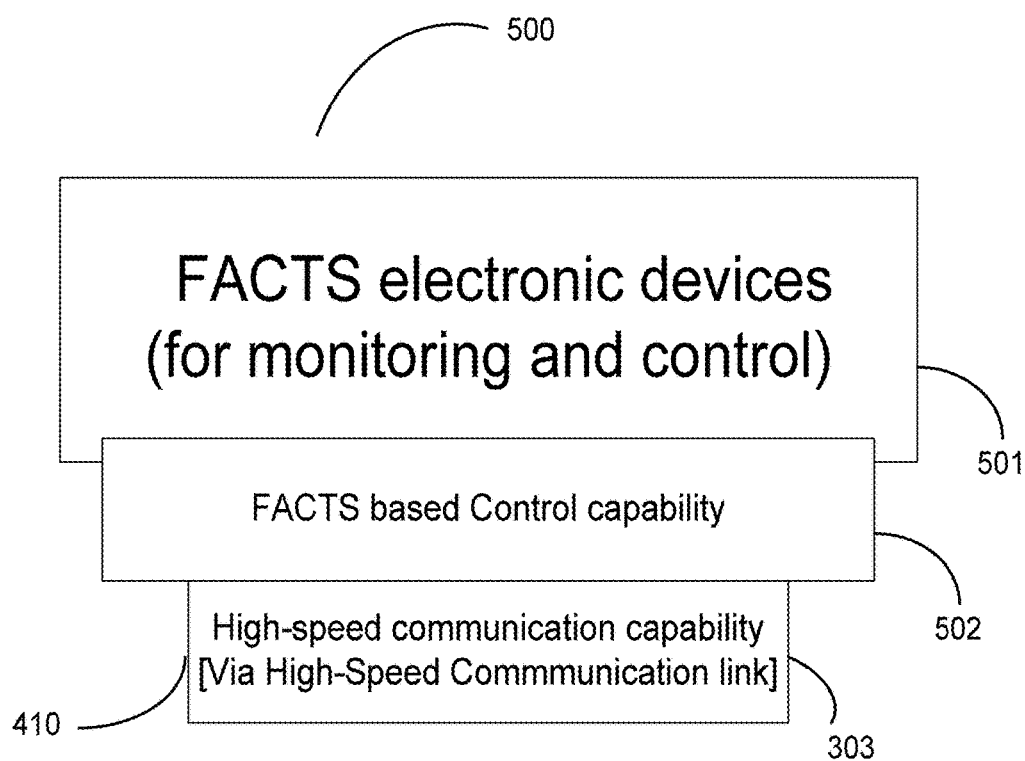
FIG. 5 is a block representation of the other actuator devices that are FACTS control devices, or electronic devices enabled to be coupled to the HV power grid with FACTS-based high-speed control capability and high-speed communication capability for monitoring and control of the HV power grid.

FIG. 5 is an exemplary block diagram of a FACTS monitoring and control module 500 that form other actuator devices that provide the capability for the FACTS electronic devices 501 connected to the total power system for controlling and analyzing its operation using the FACTS-based control capability 502 with high-speed communication capability 410, enabled through high speed link 303.

Figure 6:
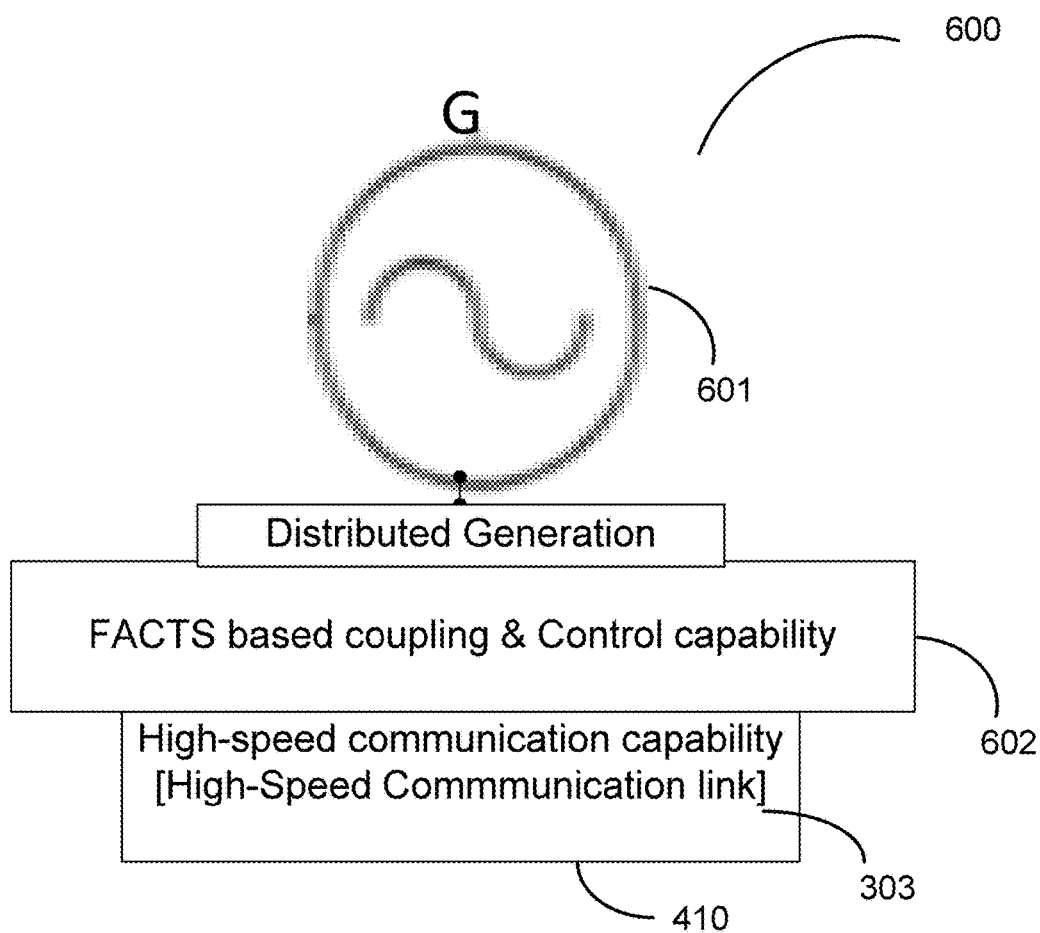
FIG. 6 is a block diagram representation of distributed power generation coupled to the HV power grid with FACTS-based control capability and high-speed communication capability.

FIG. 6 is a block diagram 600 showing the modification of the distributed generation capability 601, such as wind generation facility, solar generation facility, biogas generation facility, or other distributed power generation facility or facilities, coupled to the total power system using FACTS-based control capability 602. This enable FACTS-based control 602 of power generation and input into the HV power grid with high-speed communication capability 410 and connected via a high speed link 303 for local communication to LINCs at the edge of the power grid for establishing integrated local control capability. This enable power input changes to be locally recognized and corrective action taken locally to prevent unwanted disturbances being introduced.

Figure 7:
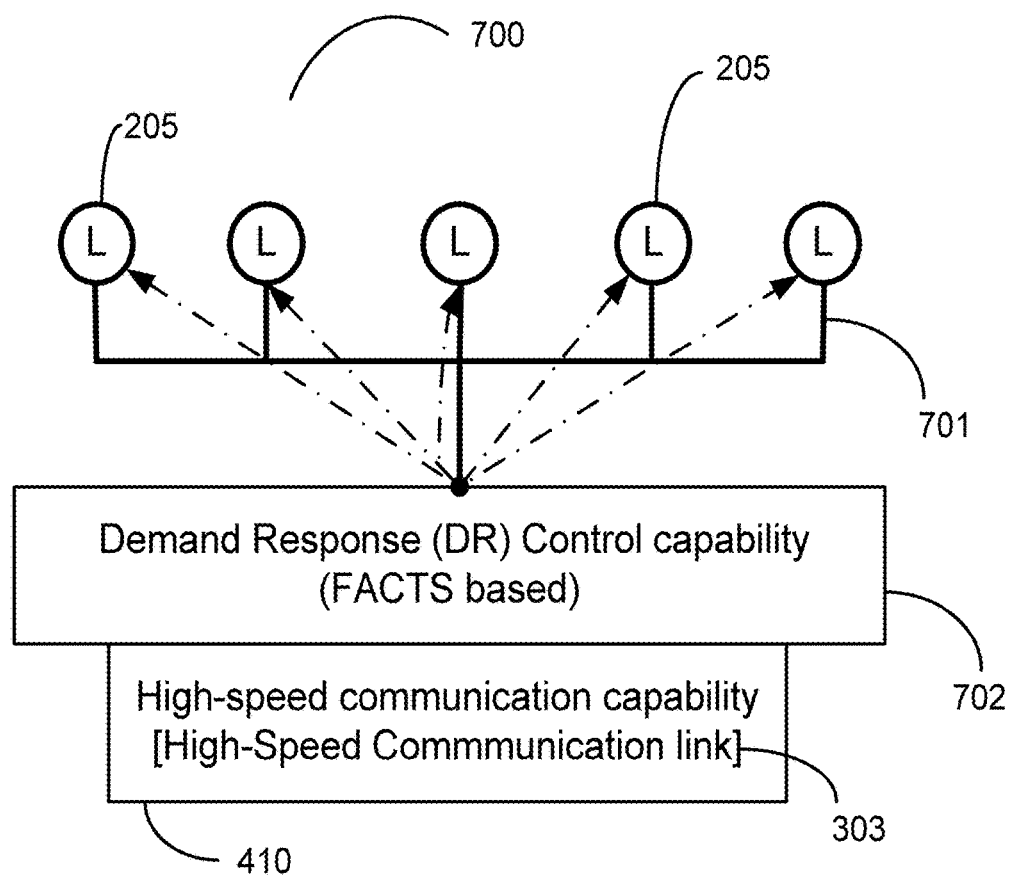
FIG. 7 is a block diagram representation of distributed loads with demand response (DR) unit coupled to the HV power grid using FACTS-based control capability and high-speed communication capability.

FIG. 7 is a block diagram 700 of the distributed loads 205 that include the FACTS-based demand response (DR) control capability 702 and the high-speed communication capability 410 via high speed communication link 303, enabling load changes to be locally recognized and corrective actions initiated.

Figure 8:
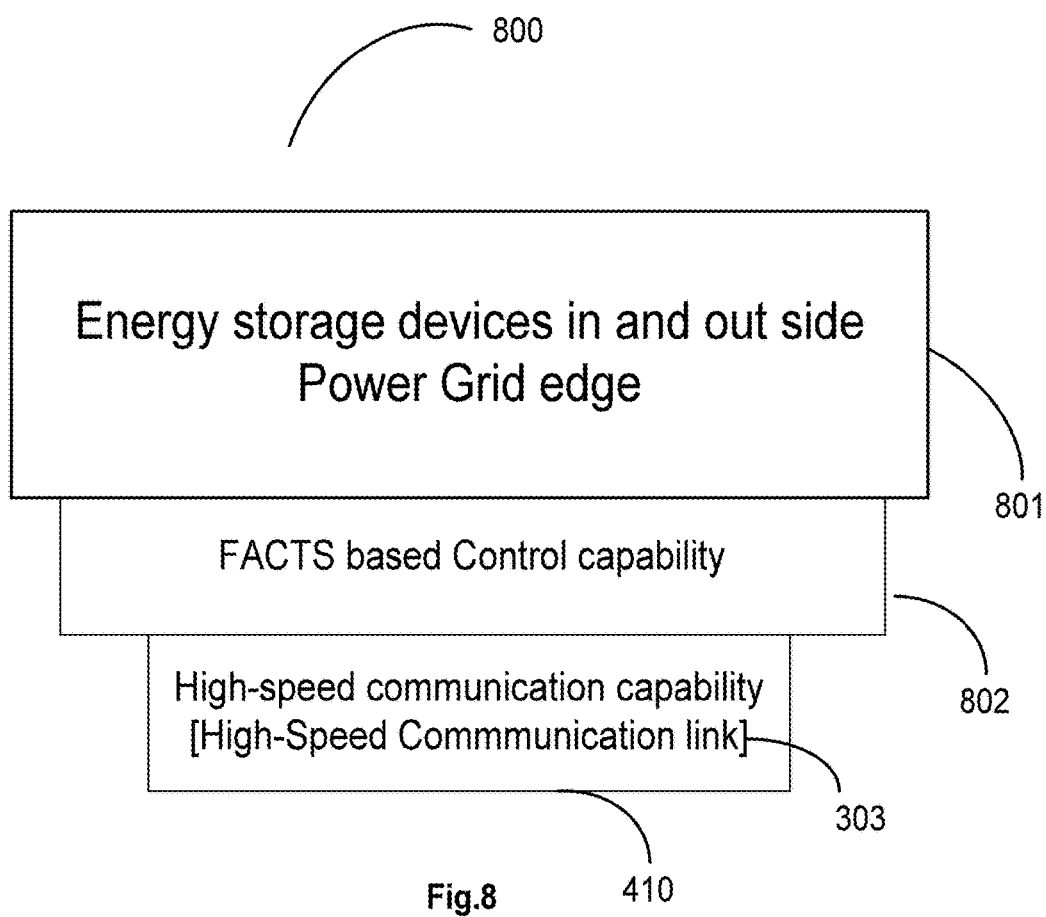
FIG. 8 is a block representation of the energy storage devices enabled to be coupled, typically within or at the edge of the power grid with FACTS-based control capability and high-speed communication capability.

FIG. 8 is a block diagram 800 showing the modifications that enable the energy storage devices 801 outside the edge of the power grid 300 coupled to the HV power grid. A controller 802, which in the case shown is a FACTS-based controller and a high-speed communication capability 410 with inter connections using high speed links 303 form part of the control capability for the total power system.

Figure 9:
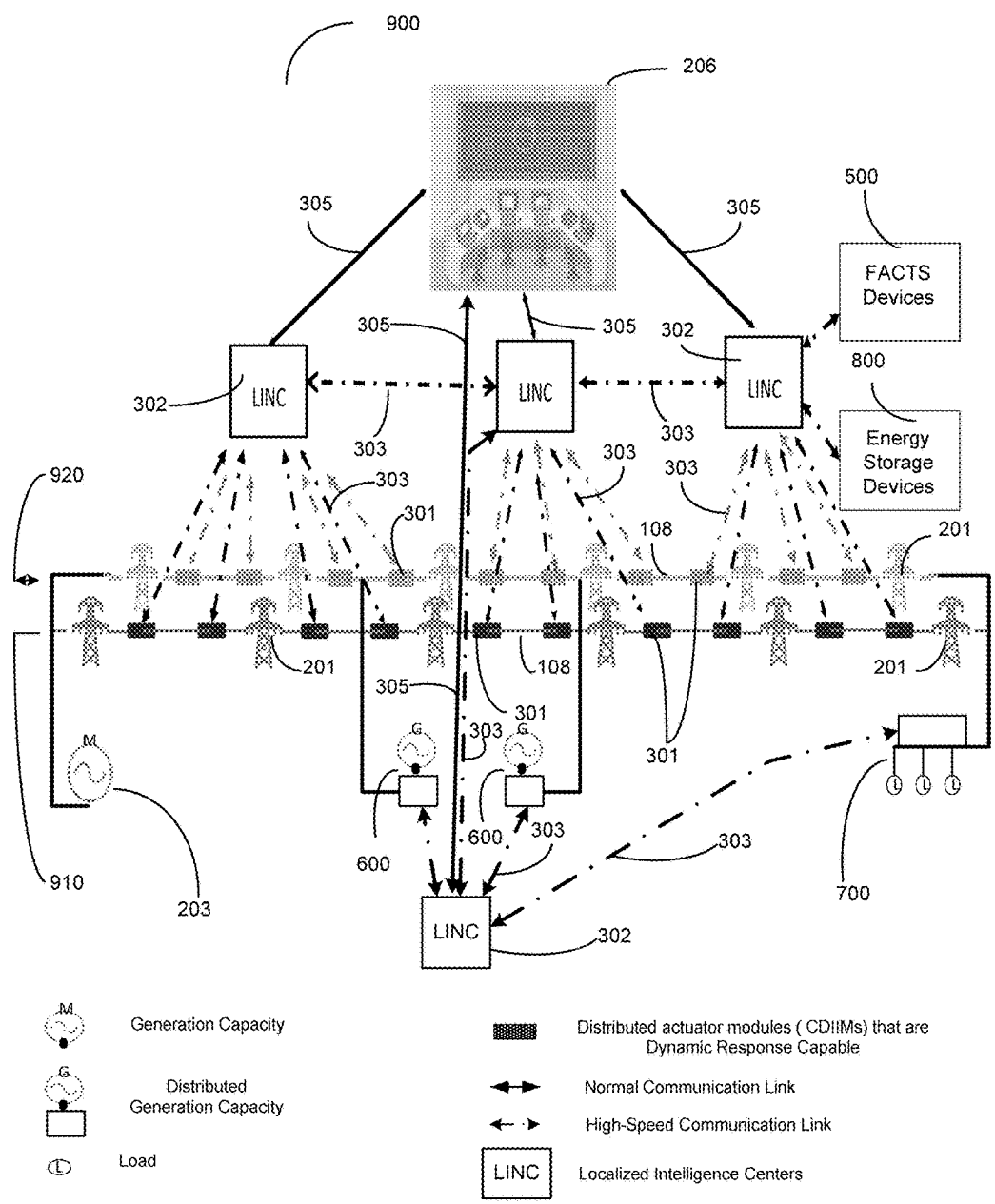
FIG. 9 is an exemplary block diagram of the total power system from generation to distribution with distributed local sub-cyclic response capability and hierarchical monitoring and supervision capabilities as per an embodiment of the current invention.

FIG. 9 is a block schematic 900 of the total power system as per the present invention, with two HV power grids 910 and 920 and associated distributed impedance injection modules 301, other actuator devices 500 that are enabled with distributed standardized control and communication capabilities. The current invention uses the capabilities established for sub-cyclic control and appropriate communication for all the distributed impedance injection modules 301, other actuator devices 500 and the miscellaneous FACTS-coupled devices, such as distributed generators 600, energy storage devices 800 etc. that are inside, at the edge and outside the edge of the power grid 300 to provide a distributed but integrated sub-cyclic control and response capability to the total power system 900. These enable optimization of the operation of the total power system 900 from generation to distribution. In the disclosed exemplary implementation the CDIIM 301, LINCs 302, other actuator devices 500, the Energy Storage devices 800, and the distributed generation capabilities 600, as well as the distributed loads with DR capabilities 700, are all with control capability that is typically FACTS-based and are interconnected locally using the high-speed communication capability 410 provided by the high-speed communication links 303 associated with each of the devices as shown and described in FIG. 4 to FIG. 8. This communication capability is provided through the nearest LINC 302, shown in FIG. 9, for localized communication and control supervision. The LINCs 302 are also interconnected with high-speed link connections 303 for high-speed inter-LINC communication between the neighboring local areas. The LINCs 302 are further connected to the utility supervisory 206 using communication connections 305 which may be slower than the high-speed connection links 303, to enable data transfer and overall supervisory control of the total power system.

The control and communication capabilities of the total power system 900, implemented within, at the edge and outside the edge of power grid 300 are integrated using typically the FACTS-based control, and high-speed communication at each of the actuator modules, other actuator devices and miscellaneous FACTS-coupled actuator devices, and covers the total power system from generation to distribution. Such a system can provide optimized, dynamic, localized control of power flows from generators to loads by adjusting the generation outputs and line currents of the HV transmission grid based on system constraints and load requirements. The high-speed communication capabilities linking the CDIIM 301, LINCs 302, with the FACTS-coupled generators 600, DR-controlled loads 700, other actuator devices 500, and FACTS-coupled energy storage devices 800 provide a system-level capability for localized, intelligent and capable of sub-cyclic control of all connected subsystems and devices within the total power system 900.

A typical example is when a distributed load comes online suddenly. Due to the inertia of the system, it takes time for the main generators to rev up and increase the supply current. The sudden increase in load can cause oscillations and droop in voltage on the HV Power grid and hence at the connected loads. In the disclosed system the drop in voltage at the load and oscillations are sensed by the distributed monitoring and control facility of the CDIIM 301. The local CDIIM 301 respond to the oscillations by producing and injecting damping voltages on the line as has been described in the parent application. In this instance the monitoring and control capability of the CDIIM 301 linked, using high-speed communication links, directly or through LINCs 302 to other CDIIMs 301, to distributed local monitoring and control capability of FACTS-coupled generators 600, and FACTS-coupled storage devices 800.

The control information/instructions provided from the CDIIMs 301 enable any locally connected FACTS-coupled energy storage devices 800 to be switched in to provide the necessary load current while the local distributed FACTS-coupled generators or the main conventional generators under supervisory control are reved up and brought online to cater to the load, thus enabling a much faster and smoother response to the additional load than possible with the current generator-distribution systems. The local monitoring and control capability at the distributed generators, load and the energy storage devices working together at the local level can resolve the problem of oscillations and sagging voltage at the distributed load. The information collected of the problem identified and the corrective action is also intimated to the supervisory utility 206 over the standard communication link 305. The supervisory utility 206 can then decide if any further action to re-balance the HV power grid and the total power system from generators to distribution is warranted for optimum operating efficiency of the total power system 900.

A second example will be when a distributed generation capability such as wind or solar generation is brought online suddenly. Due to the low inertia associated with these generating systems they can be turned on and connected to the grid to pump energy into a stable operating HV power grid. This low inertia input can result in oscillations and unbalancing of the HV power grid and the total power system. The local sensing and monitoring capability of the CDIIM 301 senses the oscillations and the unbalanced HV power grid condition and the control element reacts by generating and injecting the necessary impedance/voltages to dampen the oscillations and to re-balance the HV power grid. At the same time, the CDIIM 301 communicate over the high-speed links to the LINCs 302 to inform and provide control instructions to the FACTS control at the distributed FACTS-coupled generators 600 to control the rate of injection of power onto the HV power grid. The LINCs 302 also instruct the FACTS controllers at the FACTS-coupled energy storage devices 800 to enable storing of the excess energy pumped into the HV power grid till the HV power grid is brought back to equilibrium. Hence by using the local monitoring, control and communication capabilities at the distributed impedance injection modules 301 LINCs 302, the FACTS-coupled distributed generators 600 and the FACTS-coupled energy storage devices 800, all with high-speed communication capability, the HV power grid and the total power system stability is maintained even under these adverse conditions. The identified cause of HV power grid disturbance and the solution are also intimated to the supervisory utility 206 over the communication link 305 by the LINCs 302. The supervisory utility 206 can then decide if all the components of the total power system from generators to transmission to distribution need to be optimally re-balanced.

The disclosed total power system 900 is hence able to respond optimally and locally at high-speed, (at sub-cyclic speed) to any of the disturbances on the total power system 900. The total power system 900 is also able to optimize its operations from the generation of power, transmission of power over high voltage transmission lines of the HV power grid, to the distribution of power needed at the appropriate voltage levels and phases. The disclosed invention provides also for monitoring and control of the general operation of the HV power grid and the total power system 900, for operations such as, but not limited to, line balancing, harmonic reduction or elimination, and monitoring and control of all other important system characteristics. The monitoring and control of the total power system 900 uses the hierarchical control capability established by the currently disclosed invention. All of the above are collectively referred to as "conditions"—conditions on the total power system including the high voltage transmission lines of the HV power grid in the claims to follow.

Even though the invention disclosed is described using specific implementations, examples, circuits, and components, it is intended only to be exemplary and non-limiting. The practitioners of the art will be able to understand and modify the same based on new innovations and concepts, as they are made available. The invention is intended to encompass these modifications.

What is claimed is:

1. A high voltage power grid comprising:
    transmission lines to transport power at high voltage from power generators to sub-stations or other distributed loads;
    a plurality of impedance injection modules, each coupled to and collectively distributed along the transmission lines and each having a transmission line current measuring capability and a high-speed communication capability;
    a plurality of local intelligence centers, each having a high-speed communication capability, each impedance injection module being in communication with at least one local intelligence center;
    a utility supervisory having a communication capability with the power generation, substations and the local intelligence centers;
    whereby a hierarchical control capability is established wherein the distributed impedance injection modules will themselves respond locally to tend to reduce local disturbances, one or more local intelligence centers will coordinate a response of a plurality of distributed impedance injection modules and respective distributed impedance injection modules as needed to respond to larger disturbances, and the utility supervisory will balance and control the power grid through control of the substations, local intelligence centers and power generation.

2. The high voltage power grid of claim 1 further comprising distributed generation units, each having a FACTS based control with a high-speed communication capability, each distributed generation unit being in high-speed communication with at least one local intelligence center for control of the respective distributed generation unit.

3. The high voltage power grid of claim 2 wherein the distributed generation units comprise at least one of wind powered generation units, solar powered generation units, bioenergy power generation units or wave powered generation units.

4. The high voltage power grid of claim 1 further comprising distributed energy storage devices, each having a FACTS based control with a high-speed communication capability, each distributed generation unit being in high-speed communication with at least one local intelligence center for control of the distributed energy storage devices.

5. The high voltage power grid of claim 4 wherein the distributed energy storage devices comprise at least one of pumped storage, battery storage, flywheel storage or superconducting storage.

6. The high voltage power grid of claim 1 further comprising at least one electronic system for monitoring and control of the power flow over the high voltage power grid having a FACTS based control with a high-speed communication capability, each electronic system for monitoring and control of the power flow over the high voltage power grid being in high-speed communication with at least one local intelligence center for communication with and control of the electronic system for monitoring and control of the power flow over the high voltage power grid.

7. The high voltage power grid of claim 6 wherein the at least one electronic system for monitoring and control of the power flow over the high voltage power grid comprises at least one of a static synchronous series compensator, a static synchronous compensator, a unified power-flow controller or an interline power-flow controller.

8. The high voltage power grid of claim 7 wherein the at least one of a static synchronous series compensator, a static synchronous compensator, a unified power-flow controller or an interline power-flow controller is a FACTS based compensator or controller.

9. The high voltage power grid of claim 1 wherein the high-speed communication capability between the local intelligence centers, and between the local intelligence centers and the distributed impedance injection modules, allows a response to disturbances on the grid to be sub-cyclic to prevent such disturbances from growing into power delivery and quality issues.

10. The high voltage power grid of claim 9 wherein the disturbances on the grid are comprised of one or more of small signal instabilities, power oscillations, sub-synchronous resonance or harmonic reduction or elimination.

11. A control apparatus having a capability for hierarchical control of a total power system, the control apparatus comprising:
    a plurality of high-speed communication enabled distributed impedance injection modules distributed over a plurality of transmission lines of a high voltage power grid;
    the high-speed communication enabled distributed impedance injection modules enabled to sense an unwanted change in a high voltage transmission line current on the high voltage power line of the high voltage power grid on which it is distributed and inject an impedance to compensate for the unwanted change;
    other actuator devices, that are electronic FACTS control devices, connected to the high voltage transmission grid and enabled with high-speed communication capability enabled for monitoring and control of the high voltage grid; miscellaneous FACTS coupled actuator devices, that are a group of systems and sub-systems, coupled to an inside, at or outside an edge of the high voltage transmission grid, through FACTS based control capability;
    a plurality of local intelligence centers, each of the local intelligence centers having a high-speed communication capability, that is enabled to provide local supervisory coordination to high-speed communication enabled distributed impedance injector modules, other actuator devices and miscellaneous FACTS coupled actuator devices in a local region communicably linked to each of the local intelligence centers at high-speed;

each of the local intelligence centers further linked with the neighboring local intelligence centers through the high-speed communication capability to provide an integrated control capability across the neighboring local areas;

at least a utility supervisory in communication with traditional large conventional power generation systems, the substations and communicably linked to the plurality of local intelligence centers;

wherein an implemented communication capabilities and control capabilities providing a hierarchical control ability to the total power system from generation to distribution.

12. The control apparatus of claim 11, wherein the high-speed communication enabled distributed impedance injector modules are self-aware with intelligence built-in.

13. The control apparatus of claim 12, wherein the built-in intelligence enable the high-speed communication enabled distributed impedance injection module to modify and update a reference-settings for itself and for other actuator devices and miscellaneous FACTS-coupled actuator devices, locally connected to it through the LINCs, based on changes to the system operating conditions, while the total power system is in operation.

14. The control apparatus of claim 11, wherein the other actuator devices comprise any and all of electronic control devices enabled with high-speed (sub-cyclic) communication capability and FACTS-based control capability that comprise: static synchronous series compensators (SSSC), static synchronous compensators (STATCOMs), unified power-flow controllers (UPFCs), interline power-flow controllers (IPFCs) and other electronic systems for monitoring and control of the power flow.

15. The control apparatus of claim 11, wherein the miscellaneous FACTS-coupled actuator devices comprise: distributed generators, energy storage devices, distributed demand response units, that are coupled to the high voltage power grid with FACTS-based control capability and high speed communication capability.

16. A method of controlling a high voltage power grid having transmission lines to transport power at high voltage from power generators to sub-stations or other distributed loads comprising:

coupling a plurality of impedance injection modules to and distributed along the transmission lines, each impedance injection module for injecting impedance/voltages into the respective transmission line, each impedance injection module having a transmission line current measuring capability and a high-speed communication capability;

providing a plurality of local intelligence centers, each having a high-speed communication capability, each local intelligence center being in high speed communication with a plurality of distributed impedance injection modules;

transmitting from and receiving current measurements from at least one of the respective distributed impedance injection modules at a local intelligence center indicative of an unwanted disturbance on the respective transmission line; and transmitting from the respective local intelligence center instructions to one or more distributed impedance injection modules to cause those distributed impedance injection modules to inject impedance/voltages onto the respective transmission line tending correct the disturbance.

17. The method of claim 16 further comprising:

when the disturbance is larger than can be corrected by one local intelligence center, transmitting from the respective local intelligence center to at least one additional local intelligence center to cause those local intelligence centers to transmit instructions to respective distributed impedance injection modules to cause those distributed impedance injection modules to also inject impedance/voltages onto the respective transmission line tending correct the disturbance.

18. The method of claim 17 wherein an injection tending to correct disturbances on the grid is sub-cyclic to prevent such disturbances from growing.

19. The method of claim 17 wherein the high voltage power grid further comprises a utility supervisory having a communication capability with the power generation, substations and the local intelligence centers, and wherein the utility supervisory balances and controls the power grid through control of the substations, local intelligence centers and power generation.

20. The method of claim 19 wherein the high voltage power grid further comprises distributed generation units, each having a FACTS based control with a high-speed communication capability, and wherein each distributed generation unit is in high-speed communication with at least one local intelligence center for control of the distributed generation units.

21. The method of claim 20 wherein the distributed generation units comprise at least one of wind powered generation units, solar powered generation units, bioenergy power generation units or wave powered generation units.

22. The method of claim 20 wherein the high voltage power grid further comprises distributed energy storage devices, each having a FACTS based control with a high-speed communication capability, each distributed generation unit being in high-speed communication with at least one local intelligence center for control of the distributed energy storage devices.

23. The method of claim 22 wherein the distributed energy storage devices comprise at least one of pumped storage, battery storage, flywheel storage or superconducting storage.

24. The method of claim 20 wherein the high voltage power grid further comprises at least one electronic system for monitoring and control of the power flow over the high voltage power grid having a FACTS based control with a high-speed communication capability, each electronic system for monitoring and control of the power flow over the high voltage power grid being in high-speed communication with at least one local intelligence center for communication with and control of the electronic system for monitoring and control of the power flow over the high voltage power grid.

25. The method of claim 24 wherein the at least one electronic system for monitoring and control of the power flow over the high voltage power grid comprises at least one of a static synchronous series compensator, a static synchronous compensator, a unified power-flow controller or an interline power-flow controller.

26. The method of claim 25 wherein the at least one of a static synchronous series compensator, a static synchronous compensator, a unified power-flow controller or an interline power-flow controller is a FACTS based compensator or controller.

27. The method of claim 16 wherein the response to disturbances on the grid is sub-cyclic to prevent disturbances from growing into power delivery and quality issues as a result of the high-speed communication capability between the local intelligence centers, and between the local intelligence centers and the distributed impedance injection modules.

28. The method of claim 27 wherein the disturbances on the grid are comprised of one or more of small signal instabilities, power oscillations, sub-synchronous resonance or harmonic oscillation reduction or elimination.

* * * * *

UNITED STATES PATENT AND TRADEMARK OFFICE
CERTIFICATE OF CORRECTION

PATENT NO. : 10,218,175 B2  
APPLICATION NO. : 15/428906  
DATED : February 26, 2019  
INVENTOR(S) : Haroon Inam et al.

Page 1 of 1

It is certified that error appears in the above-identified patent and that said Letters Patent is hereby corrected as shown below:

On the Title Page

Item [72], under Inventors, at Line 5, please delete "Aaron Zhao" and insert --Aaron Zhou--.

Signed and Sealed this  
Eighth Day of December, 2020

Andrei Iancu  
*Director of the United States Patent and Trademark Office*